US011073140B2

(12) United States Patent
Chen

(10) Patent No.: US 11,073,140 B2
(45) Date of Patent: Jul. 27, 2021

(54) LIQUID STORAGE TANK UPPER COVER ASSEMBLY OF DRAWING OR ADDING LIQUID MACHINE AND DRAWING OR ADDING LIQUID MACHINE

(71) Applicant: Jiashan Jinzhan Tool Co., Ltd., Jiaxing (CN)

(72) Inventor: Jinquan Chen, Jiaxing (CN)

(73) Assignee: Jiashan Jinzhan Tool Co., Ltd., Jiashan (CN)

( * ) Notice: Subject to any disclaimer, the term of this patent is extended or adjusted under 35 U.S.C. 154(b) by 139 days.

(21) Appl. No.: 16/435,142

(22) Filed: Jun. 7, 2019

(65) Prior Publication Data

US 2020/0261936 A1 Aug. 20, 2020

(30) Foreign Application Priority Data

Feb. 14, 2019 (CN) .......................... 201920198214.2

(51) Int. Cl.
| | |
|---|---|
| *F04B 9/14* | (2006.01) |
| *F04B 23/02* | (2006.01) |
| *F04F 3/00* | (2006.01) |
| *F16K 11/07* | (2006.01) |
| *F04B 33/00* | (2006.01) |

(Continued)

(52) U.S. Cl.
CPC ................ *F04B 9/14* (2013.01); *B05B 11/30* (2013.01); *B05B 11/3002* (2013.01); *B05B 11/3038* (2013.01); *B05B 11/3066* (2013.01); *F04B 23/025* (2013.01); *F04B 33/00* (2013.01); *F04B 53/1092* (2013.01); *F04F 1/06* (2013.01); *F04F 3/00* (2013.01); *F16K 11/07* (2013.01); *Y10T 137/86099* (2015.04)

(58) Field of Classification Search
CPC ........ B67D 7/0266; F04B 9/14; F04B 23/025; F04B 33/00; F04B 53/1092; F04B 11/30; F16K 11/07; F04F 1/00; F04F 3/00; F04F 1/06; Y10T 137/86099; B05B 11/3038; B05B 11/3066
See application file for complete search history.

(56) References Cited

U.S. PATENT DOCUMENTS

| | | | |
|---|---|---|---|
| 6,357,492 B1 * | 3/2002 | Hsu ...................... | B67D 7/0205 137/565.25 |
| 2006/0027608 A1 * | 2/2006 | Chen ........................ | F04F 5/20 222/401 |

(Continued)

*Primary Examiner* — Atif H Chaudry
(74) *Attorney, Agent, or Firm* — Schwegman Lundberg & Woessner, P.A.

(57) ABSTRACT

This invention disclosures a liquid storage tank upper cover assembly of a drawing or adding liquid machine and a drawing or adding liquid machine. The liquid storage tank upper cover assembly includes an upper cover, a switching valve foundation disposed at an upper end of the upper cover and a valve cartridge cooperated with the switching valve foundation. The upper cover and the switching valve foundation are a one-piece molded part. The switching valve foundation has a sliding hole, a lower part of the upper cover has a first through-hole and a second through-hole which are spaced apart, and the first through-hole and the second through-hole are both connected to the sliding hole. The switching valve foundation has a third through-hole connected with the sliding hole. The valve cartridge is glidingly provided in the sliding hole.

9 Claims, 6 Drawing Sheets

(51) Int. Cl.
*F04F 1/06* (2006.01)
*F04B 53/10* (2006.01)
*B05B 11/00* (2006.01)

(56) References Cited

U.S. PATENT DOCUMENTS

2010/0254838 A1* 10/2010 Tseng .................. F04B 9/14
417/437
2012/0107161 A1* 5/2012 Sun .................... F04B 33/00
417/482
2013/0146165 A1* 6/2013 Ma ..................... F16K 31/122
137/625.17

* cited by examiner

LIQUID STORAGE TANK UPPER COVER ASSEMBLY OF DRAWING OR ADDING LIQUID MACHINE AND DRAWING OR ADDING LIQUID MACHINE

CROSS-REFERENCE TO RELATED APPLICATIONS

This Non-provisional application claims priority under 35 U.S.C. § 119(a) on Chinese Patent Application No(s). 201920198214.2 filed on Feb. 14, 2019, the entire contents of which are hereby incorporated by reference.

BACKGROUND OF THE INVENTION

Field of the Invention

This invention relates to a technical field of mechanical tool, and more particularly, to a liquid storage tank upper cover assembly of a drawing or adding liquid machine and a drawing or adding liquid machine.

Description of the Related Art

The positive air pressure and negative air pressure switching valve and the upper cover of the liquid storage tank of the existing drawing or adding liquid machine in the market are in a separated structure. This structure leads to complicated assembly of components, high operation difficulty, and high sealing probability resulting in high probability of air leakage. Ultimately, the production cost is high, the efficiency is slow, and the failure rate is high.

BRIEF SUMMARY OF THE INVENTION

In response to the above problems, this invention overcomes at least one deficiency and discloses a liquid storage tank upper cover assembly of a drawing or adding liquid machine and a drawing or adding liquid machine.

The technical solution used by the invention is as follows:

The liquid storage tank upper cover assembly of the drawing or adding liquid machine includes an upper cover, a switching valve foundation disposed at an upper end of the upper cover and a valve cartridge cooperated with the switching valve foundation. The upper cover and the switching valve foundation are a one-piece molded part. The switching valve foundation has a sliding hole, a lower part of the upper cover has a first through-hole and a second through-hole which are spaced apart, and the first through-hole and the second through-hole are both connected to the sliding hole. The switching valve foundation has a third through-hole connected with the sliding hole. The valve cartridge is glidingly provided in the sliding hole. The valve cartridge has a first working position and a second working position. When the valve cartridge is in the first working position, the first through-hole and the third through-hole are hermetically connected, and the second through-hole is connected with an external air by the sliding hole. When the valve cartridge is in the second working position, the second through-hole and the third through-hole are hermetically connected, the first through-hole is connected with the external air by the sliding hole.

The switching valve foundation and the upper cover of the liquid storage tank upper cover assembly in this invention are in one piece reducing the number of the parts, which reduces assembly steps, lowers the defective rate of the product in production and decreases the failure rate of the user in use. The two words "hermetically connected" in this invention refer to: gas flowing between the two through-holes does not leak from the valve cartridge and the switching valve foundation. By the switching of the two working positions of the valve cartridge, the connection between the through-holes can be changed, which realize the switching of the drawing or adding liquid.

In one of the embodiments of this invention, an outer side wall of the valve cartridge may have a first annular groove, a middle end of the first annular groove may have a ringed partition part. The partition part may divide the first annular groove into a first part and a second part. Two sides of the first annular groove may be respectively provided with a first seal and a second seal, and an outer side wall of the partition part may be provided with a third seal. When the valve cartridge is in the first working position, the first seal and the third seal both may be sealed with the sliding hole and the second seal may be separated with the sliding hole, so that the first through-hole, the first part, and the third through-hole may be sequentially connected. When the valve cartridge is in the second working position, the second seal and the third seal both may be sealed with the sliding hole and the first seal may be separated with the sliding hole, so that the second through-hole, the second part, and the third through-hole may be sequentially connected.

By adjusting the position of the valve cartridge, the valve cartridge can slide in the sliding hole, so that the working position of the valve cartridge can be switched. When in the first working position, the sequential connection among the first through-hole, the first part, and the third through-hole is realized, and the connection between the second through-hole and the external air is realized. When in the second working position, the sequential connection among the second through-hole, the second part, and the third through-hole is realized, and the connection between the first through-hole and the external air is realized.

In one of the embodiments of this invention, two ends of the valve cartridge may be respectively provided with a first anti-off part and a second anti-off part, and the first anti-off part may be close to the first through-hole. When the valve cartridge is in the first working position, the first anti-off part may abut to the switching valve foundation. When the valve cartridge is in the second working position, the second anti-off part may abut to the switching valve foundation.

By providing with the first anti-off part and the second anti-off part, the movement of the valve cartridge is limited, to prevent the valve cartridge coming out from the sliding hole.

In one of the embodiments of this invention, the valve cartridge may include a body part and an operating part. The first annular groove and the partition part both may be disposed at the body part. An end of the body part may have the first anti-off part, another end may have a thread section. The operating part may have a thread hole cooperated with the thread section, and an end of the operating part close to the body part may have the second anti-off part.

Such structure of the valve cartridge is easy to install and maintain.

In one of the embodiments of this invention, both two sides of valve cartridge may have a ringed mounting slot, the partition part also may have a ringed mounting slot, and the first seal, the second seal, and the third seal may be disposed in the corresponding ringed mounting slot.

This invention also disclosures the drawing or adding liquid machine including the liquid storage tank upper cover assembly as described above. The drawing or adding liquid machine also may include:

a pump, an upper part of a side wall of the pump may have a first air vent, and a lower part of a side wall of the pump may have a second air vent. The first air vent may be connected with a lower end of the first through-hole through a first pipeline, and the second air vent may be connected with a lower end of the second through-hole through a second pipeline. The second pipeline may have a one-way valve structure, and the one-way valve structure may be used to prevent the air from flowing into the pump from the second pipeline;

a piston assembly, may be disposed at the pump movably up and down, and the piston assembly may be may divide the pump into an upper space and a lower space. When the piston assembly moves downward, the upper space and the lower space may be not connected, and the piston assembly may push the air into the second pipeline. When the piston assembly moves upward, the upper space and the lower space may be connected;

a connecting rod, a lower end of the connecting rod may be connected with the piston assembly, and an upper end of the connecting rod may be inserted out of the pump;

a handle, may be fixedly disposed at the upper end of the connecting rod;

a liquid storage tank, the upper cover may be hermetically disposed at an upper end of the liquid storage tank, and a region of the upper cover corresponding to the liquid storage tank may have a fourth through-hole;

a third pipeline, an end of the third pipeline may be connected with the third through-hole, and another end of the third pipeline may be connected with the fourth through-hole; and a fourth pipeline, an end of the fourth pipeline may be disposed at an inside lower end of the liquid storage tank, and another end of the fourth pipeline may be inserted out of the upper cover.

The switching valve foundation and the upper cover of the drawing or adding liquid machine in this invention may be in one piece reducing the number of the parts, which reduces assembly steps, lowers the defective rate of the product in production and decreases the failure rate of the user in use. The appearance is simple and beautiful, so that it is suitable for both commercial use and household use, and it can be used as a pumping machine, car wash tool, garden spray machine, etc.

The drawing or adding liquid machine may have two working modes, one may be drawing liquid mode (when the valve cartridge is in the first working position) and the other may be adding liquid mode (when the valve cartridge is in the second working position). The specific working principle of the drawing or adding liquid machine is as follows:

Control the movement of the valve cartridge, so that the valve cartridge is in the first working position, at which time the drawing or adding liquid machine is in the drawing liquid mode. At the same time, the first through-hole, the first part, and the third through-hole are sequentially connected, and the second through-hole is connected with the external air through the sliding hole. Lifting and pressing the handle repeatedly to pump up, the handle drives the piston assembly to reciprocate up and down by the connecting rod. Thus, each time the piston assembly is depressed, air of the lower space is discharged unidirectionally through the second pipeline, the second through-hole, and the sliding hole, while the air inside the liquid storage tank enters the upper space through the third pipeline, the first part, and the first pipeline. The inside of the liquid storage tank is made into a negative air pressure, so that an end of the fourth pipeline passing through the upper cover can be inserted into a device that requires pumping liquid to perform the pumping operation.

Control the movement of the valve cartridge, so that the valve cartridge is in the second working position, at which time the drawing or adding liquid machine is in the adding liquid mode. At the same time, the second through-hole, the second part, and the third through-hole are sequentially connected, and the first through-hole is connected with the external air through the sliding hole. Lifting and pressing the handle repeatedly to pump up, the handle drives the piston assembly to reciprocate up and down by the connecting rod. Thus, each time the piston assembly is depressed, the external air enters into the upper space through the sliding hole, the first through-hole, and the first pipeline, while the air of the lower space enters into the liquid storage tank through the second pipeline, the second through-hole, the second part, and the third pipeline. The inside of the liquid storage tank is made into a positive air pressure, so that the liquid inside the liquid storage tank is discharged through the fourth pipeline under the action of positive air pressure to enter into a device that requires adding liquid to perform the adding operation.

In one of the embodiments of this invention, the drawing or adding liquid machine also may include a foundation. A lower end of the pump and a lower end of the liquid storage tank both may be hermetically and fixedly disposed at the foundation, the upper cover may have a locating part, and the locating part hermetically cooperates with an upper end of the pump. Such structure has good strength and is relatively compact.

In one of the embodiments of this invention, the piston assembly may include:

a piston, an outer side wall of the piston may have a second annular groove. The second annular groove may include an upper side wall, a lower side wall, and a columnar side wall connected with the upper side wall and the lower side wall. The lower side wall may have a connecting hole through the piston; and a fourth seal, may be disposed at the second annular groove. The fourth seal may be glidingly cooperates with an inside wall of the pump, and the thickness of the fourth seal may be smaller than the height of the columnar side wall. When the piston moves downward, the fourth seal may abut to the upper side wall. When the piston moves upward, the fourth seal may abut to the lower side wall. A space may be disposed between the fourth seal and the upper side wall, and the upper space may be connected with the lower space through the connecting hole.

In one of the embodiments of this invention, a shaft of the pump may be parallel to a shaft of the liquid storage tank, the switching valve foundation may be disposed between the pump and the liquid storage tank, and the shaft of the sliding hole may be vertical to the shaft of the pump. Such settings makes the structure more compact.

In one of the embodiments of this invention, an upper part of the upper cover may have a grip, and the disposed grip may be convenient for lifting the drawing or adding liquid machine.

The beneficial effects of this invention are as follows: the switching valve foundation and the upper cover of the liquid storage tank upper cover assembly in this invention are in one piece, which reduces assembly steps, lowers the defective rate of the product in production and decreases the failure rate of the user in use. By the switching of the two working positions of the valve cartridge, the connection between the through-holes can be changed, which realize the switching of the drawing or adding liquid.

These and other features, aspects, and advantages of the present invention will become better understood with regard to the following description, appended claims, and accompanying drawings.

1, upper cover; 2, switching valve foundation; 3, valve cartridge; 4, sliding hole; 5, first through-hole; 6, second through-hole; 7, third through-hole; 8, first annular groove; 9, partition part; 10, first part; 11, second part; 13, first anti-off part; 14, second anti-off part; 15, body part; 16, operating part; 17, thread section; 18, ringed mounting slot; 19, pump; 20, first air vent; 21, second air vent; 22, first pipeline; 23, second pipeline; 24, one-way valve structure; 25, piston assembly; 26, upper space; 27, lower space; 28, connecting rod; 29, handle; 30, liquid storage tank; 31, fourth through-hole; 32, third pipeline; 33, fourth pipeline; 34, foundation; 35, locating part; 36, piston; 37, second annular groove; 38, upper side wall; 39, lower side wall; 40, columnar side wall; 41, connecting hole; 42, fourth seal; 43, grip; 44, first seal; 45, second seal; 46, third seal.

DETAILED DESCRIPTION OF THE INVENTION

This invention will be described in detail below with reference to the accompanying drawings.

Figure 1:
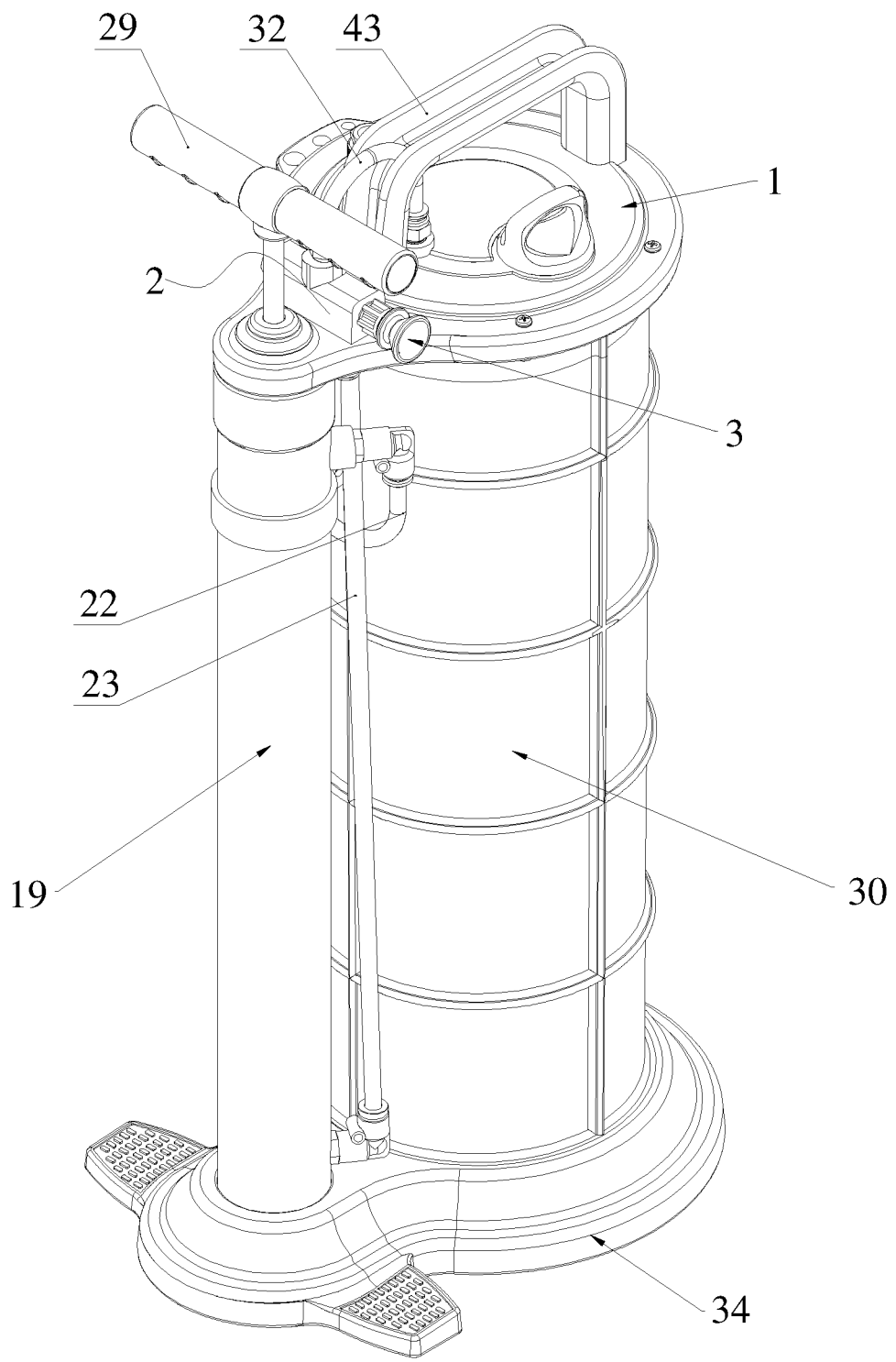
FIG. 1 is a structural diagram of a drawing or adding liquid machine in this invention.
Figure 5:
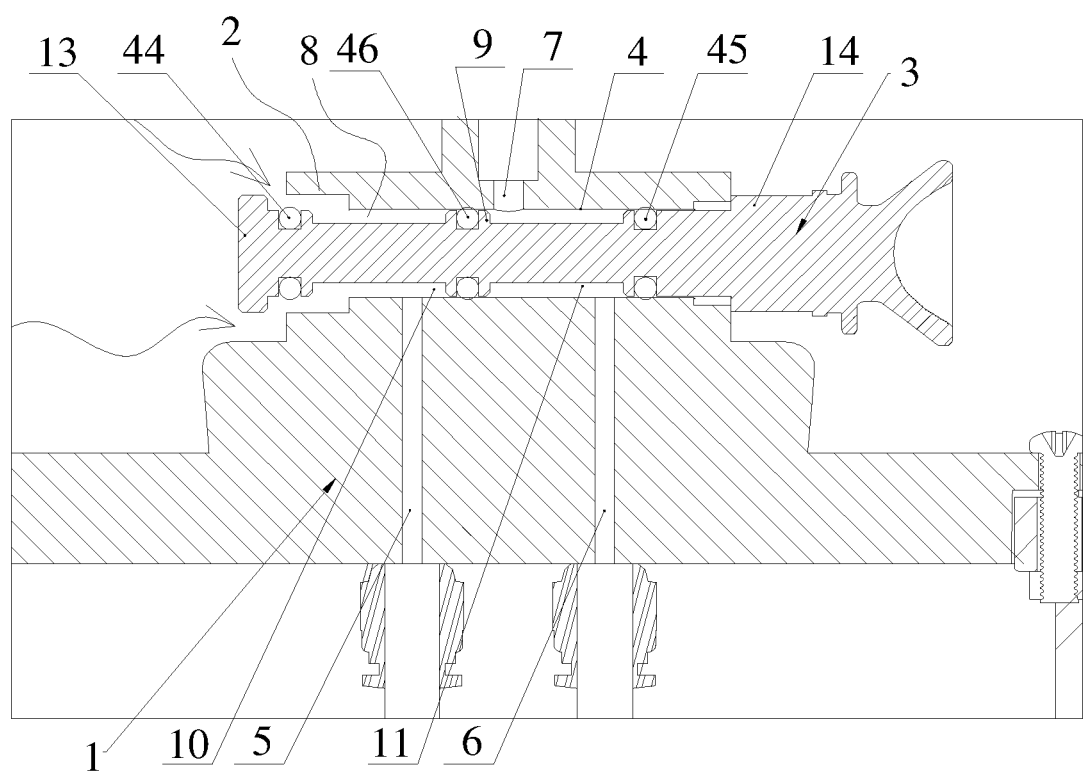
FIG. 5 is an enlarged view of B in FIG. 4.
Figure 6:
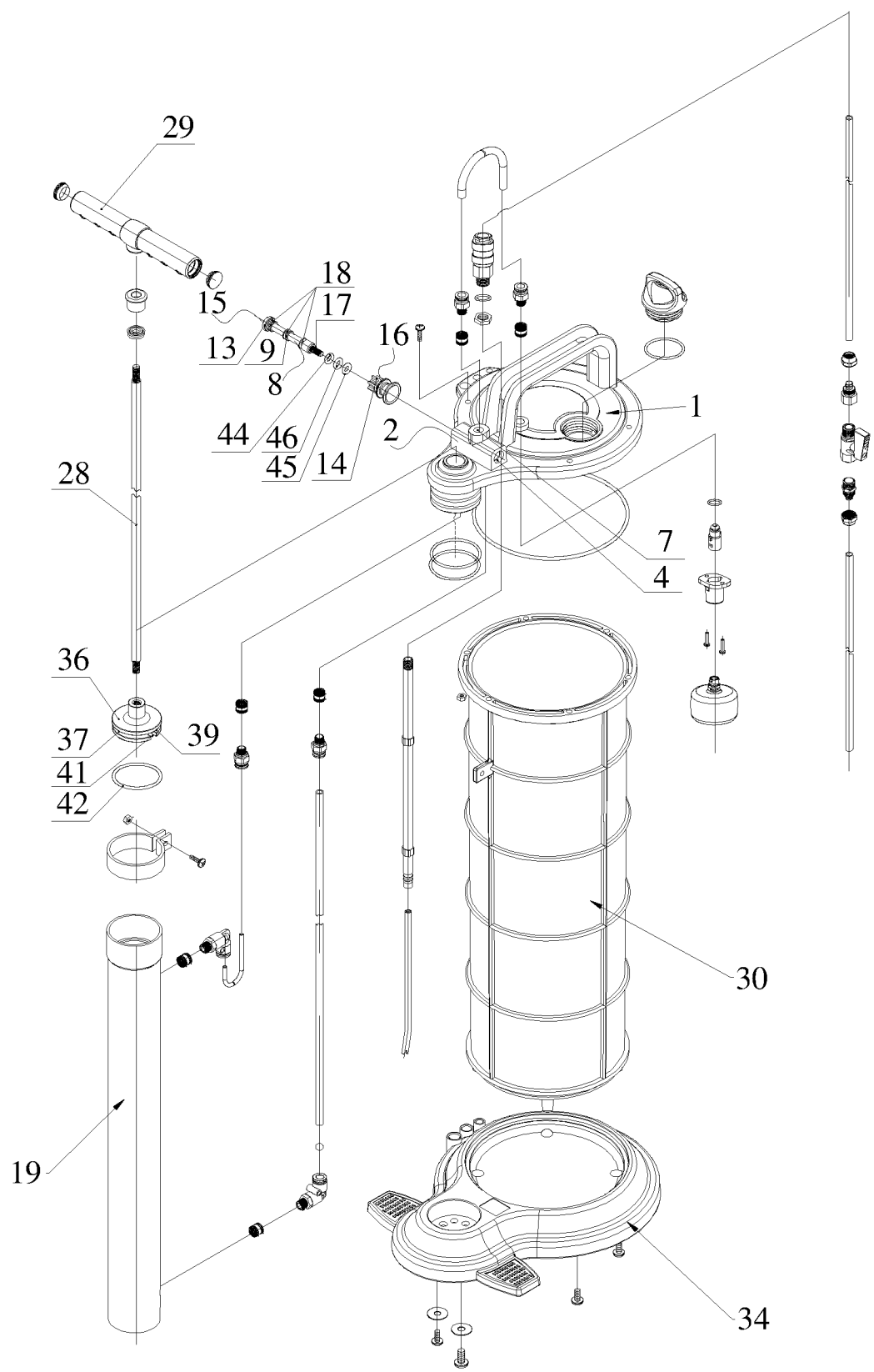
FIG. 6 is an exploded view of the drawing or adding liquid machine in this invention.

As shown in FIG. 1 and FIG. 6, a drawing or adding liquid machine includes a liquid storage tank 30 upper cover assembly. As shown in FIG. 2, FIG. 3, FIG. 4, and FIG. 5, the liquid storage tank upper cover assembly includes an upper cover 1, a switching valve foundation 2 disposed at an upper end of the upper cover 1 and a valve cartridge 3 cooperated with the switching valve foundation 2. The upper cover 1 and the switching valve foundation 2 are a one-piece molded part. The switching valve foundation 2 has a sliding hole 4, a lower part of the upper cover 1 has a first through-hole 5 and a second through-hole 6 which are spaced apart, and the first through-hole 5 and the second through-hole 6 are both connected to the sliding hole 4. The switching valve foundation 2 has a third through-hole 7 connected with the sliding hole 4. The valve cartridge 3 is glidingly provided in the sliding hole 4. The valve cartridge 3 has a first working position and a second working position. When the valve cartridge 3 is in the first working position, the first through-hole 5 and the third through-hole 7 are hermetically connected, and the second through-hole 6 is connected with an external air by the sliding hole 4. When the valve cartridge 3 is in the second working position, the second through-hole 6 and the third through-hole 7 are hermetically connected, the first through-hole 5 is connected with the external air by the sliding hole 4.

The switching valve foundation 2 and the upper cover 1 of the liquid storage tank upper cover assembly in this invention are in one piece reducing the number of the parts, which reduces assembly steps, lowers the defective rate of the product in production and decreases the failure rate of the user in use. The two words "hermetically connected" in this invention refer to: gas flowing between the two through-holes does not leak from the valve cartridge 3 and the switching valve foundation 2. By the switching of the two working positions of the valve cartridge 3, the connection between the through-holes can be changed, which realize the switching of the drawing or adding liquid.

Figure 3:
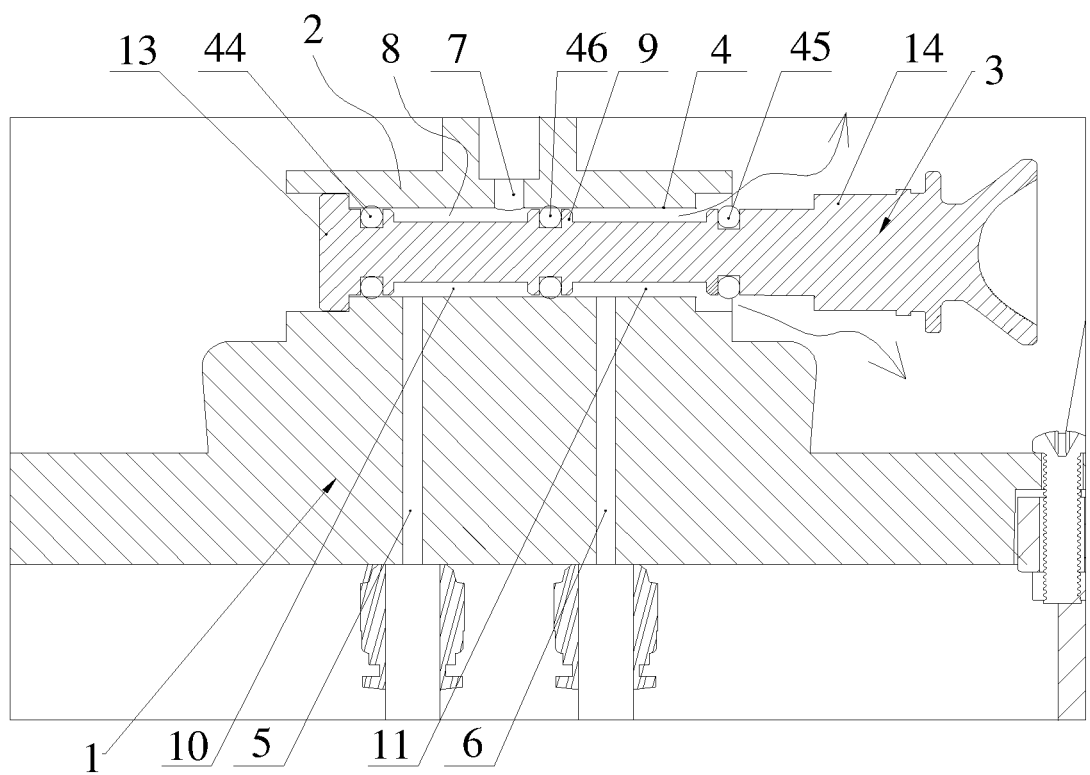
FIG. 3 is an enlarged view of A in FIG. 2.

As shown in FIG. 3 and FIG. 5, in this embodiment, an outer side wall of the valve cartridge 3 has a first annular groove 8, a middle end of the first annular groove 8 has a ringed partition part 9. The partition part 9 divides the first annular groove 8 into a first part 10 and a second part 11. Two sides of the first annular groove 8 are respectively provided with a first seal 44 and a second seal 45, and an outer side wall of the partition part 9 is provided with a third seal 46. When the valve cartridge 3 is in the first working position, the first seal 44 and the third seal 46 both are sealed with the sliding hole 4 and the second seal 45 is separated with the sliding hole 4, so that the first through-hole 5, the first part 10, and the third through-hole 7 are sequentially connected. When the valve cartridge 3 is in the second working position, the second seal 45 and the third seal 46 both are sealed with the sliding hole 4 and the first seal 44 is separated with the sliding hole 4, so that the second through-hole 6, the second part 11, and the third through-hole 7 are sequentially connected.

By adjusting the position of the valve cartridge 3, the valve cartridge 3 can slide in the sliding hole 4, so that the working position of the valve cartridge 3 can be switched. When in the first working position, the sequential connection among the first through-hole 5, the first part 10, and the third through-hole 7 is realized, and the connection between the second through-hole 6 and the external air is realized. When in the second working position, the sequential connection among the second through-hole 6, the second part 11, and the third through-hole 7 is realized, and the connection between the first through-hole 5 and the external air is realized.

Figure 4:
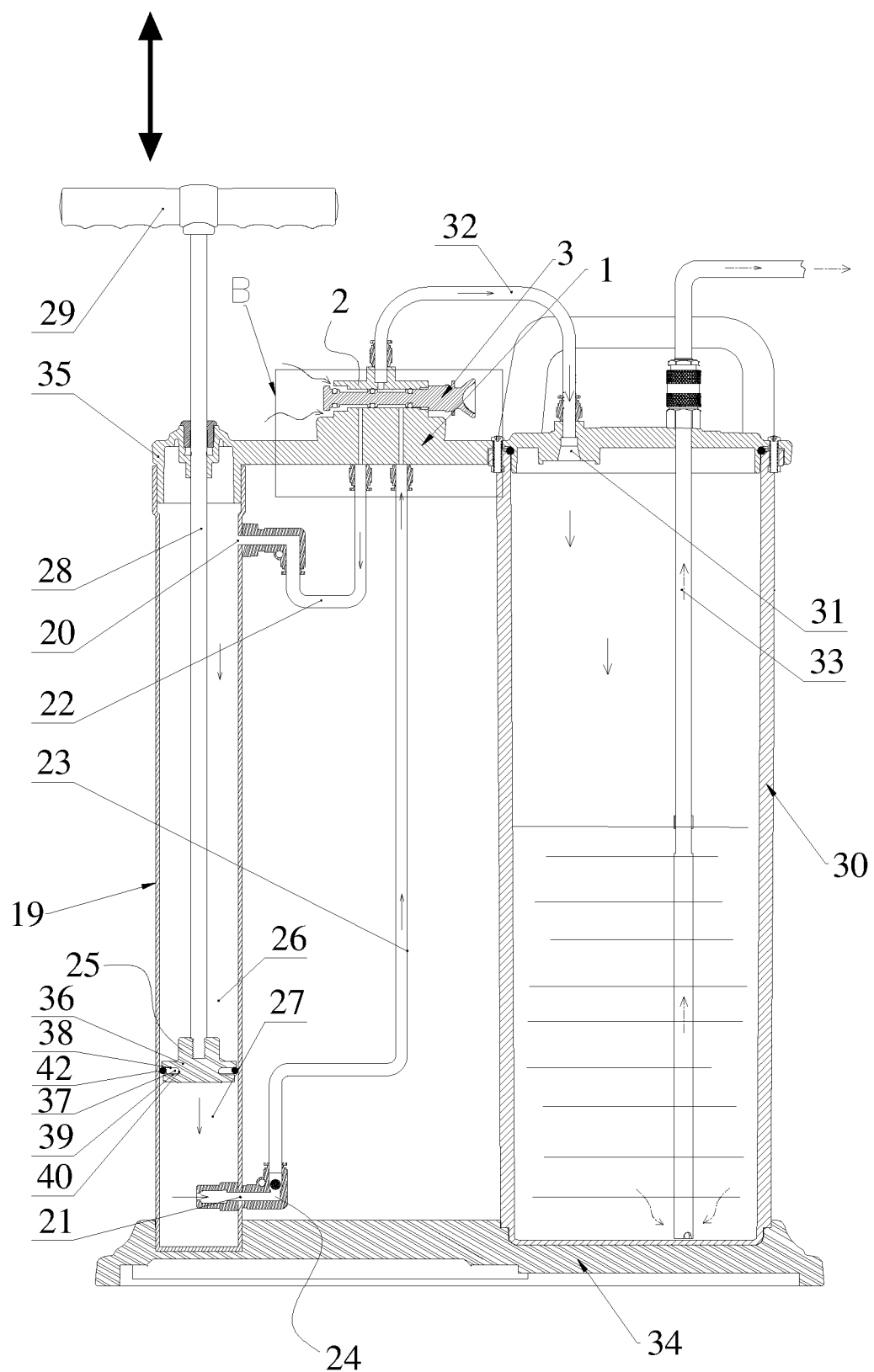
FIG. 4 is a schematic diagram of the drawing or adding liquid machine when the valve cartridge is in the second working position.

As shown in FIG. 3 and FIG. 4, in this embodiment, two ends of the valve cartridge 3 are respectively provided with a first anti-off part 13 and a second anti-off part 14, and the first anti-off part 13 is close to the first through-hole 5. When the valve cartridge 3 is in the first working position, the first anti-off part 13 abuts to the switching valve foundation 2. When the valve cartridge 3 is in the second working position, the second anti-off part 14 abuts to the switching valve foundation 2. By providing with the first anti-off part 13 and the second anti-off part 14, the movement of the valve cartridge 3 is limited, to prevent the valve cartridge 3 coming out from the sliding hole 4.

As shown in FIG. 6, in this embodiment, the valve cartridge 3 includes a body part 15 and an operating part 16. The first annular groove 8 and the partition part 9 both are disposed at the body part 15. An end of the body part 15 has the first anti-off part 13, another end has a thread section 17. The operating part 16 has a thread hole (not shown in the figures) cooperated with the thread section 17, and an end of the operating part 16 close to the body part 15 has the second anti-off part 14. Such structure of the valve cartridge 3 is easy to install and maintain.

As shown in FIG. 6, in this embodiment, both two sides of valve cartridge 3 have a ringed mounting slot 18, the partition part 9 also has a ringed mounting slot 18, and the first seal 44, the second seal 45, and the third seal 46 are disposed in the corresponding ringed mounting slot 18.

As shown in FIG. 2, FIG. 3, FIG. 4, and FIG. 5, The drawing or adding liquid machine in this embodiment also includes:

a pump 19, an upper part of a side wall of the pump 19 has a first air vent 20, and a lower part of a side wall of the pump 19 has a second air vent 21. The first air vent 20 is connected with a lower end of the first through-hole 5 through a first pipeline 22, and the second air vent 21 is connected with a lower end of the second through-hole 6 through a second pipeline 23. The second pipeline 23 has a one-way valve structure 24, and the one-way valve structure 24 is used to prevent the air from flowing into the pump 19 from the second pipeline 23;

a piston assembly 25, is disposed at the pump 19 movably up and down, and the piston assembly 25 is divides the pump 19 into an upper space 26 and a lower space 27. When the piston assembly 25 moves downward, the upper space 26 and the lower space 27 are not connected, and the piston assembly 25 pushes the air into the second pipeline 23. When the piston assembly 25 moves upward, the upper space 26 and the lower space 27 are connected;

a connecting rod 28, a lower end of the connecting rod 28 is connected with the piston 36 assembly 25, and an upper end of the connecting rod 28 is inserted out of the pump 19;

a handle 29, is fixedly disposed at the upper end of the connecting rod 28;

a liquid storage tank 30, the upper cover 1 is hermetically disposed at an upper end of the liquid storage tank 30, and a region of the upper cover 1 corresponding to the liquid storage tank 30 has a fourth through-hole 31;

a third pipeline 32, an end of the third pipeline 32 is connected with the third through-hole 7, and another end of the third pipeline 32 is connected with the fourth through-hole 31; and a fourth pipeline 33, an end of the fourth pipeline 33 is disposed at an inside lower end of the liquid storage tank 30, and another end of the fourth pipeline 33 is inserted out of the upper cover 1.

Figure 2:
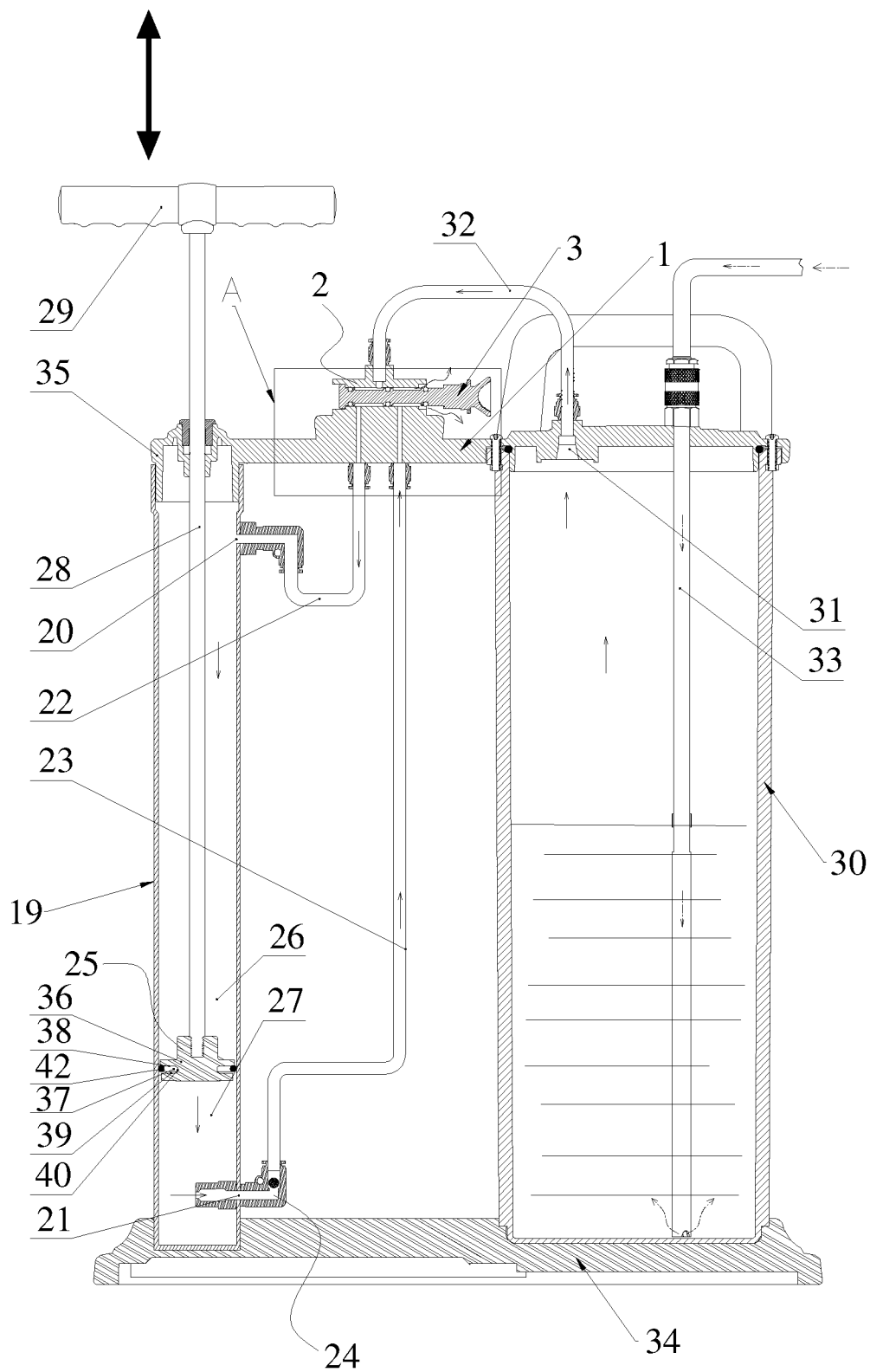
FIG. 2 is a schematic diagram of the drawing or adding liquid machine when a valve cartridge is in the first working position.

It should be noted that FIG. 2 and FIG. 4 are schematic diagrams made to conveniently understand of the solution of the embodiment, and are not cross-sectional views of the actual structure. The appearance of the drawing or adding liquid machine is simple and beautiful, so that it is suitable for both commercial use and household use, and it can be used as a pumping machine, car wash tool, garden spray machine, etc.

The drawing or adding liquid machine has two working modes, one is drawing liquid mode (when the valve cartridge 3 is in the first working position) and the other is adding liquid mode (when the valve cartridge 3 is in the second working position). The specific working principle of the drawing or adding liquid machine is as follows:

Control the movement of the valve cartridge 3, so that the valve cartridge 3 is in the first working position, at which time the drawing or adding liquid machine is in the drawing liquid mode. At the same time, the first through-hole 5, the first part 10, and the third through-hole 7 are sequentially connected, and the second through-hole 6 is connected with the external air through the sliding hole 4. Lifting and pressing the handle 29 repeatedly to pump up, the handle 29 drives the piston assembly 25 to reciprocate up and down by the connecting rod 28. Thus, each time the piston assembly 25 is depressed, air of the lower space 27 is discharged unidirectionally through the second pipeline 23, the second through-hole 6, and the sliding hole 4, while the air inside the liquid storage tank 30 enters the upper space 26 through the third pipeline 32, the first part 10, and the first pipeline 22. The inside of the liquid storage tank 30 is made into a negative air pressure, so that an end of the fourth pipeline 33 passing through the upper cover 1 can be inserted into a device that requires pumping liquid to perform the pumping operation.

Control the movement of the valve cartridge 3, so that the valve cartridge 3 is in the second working position, at which time the drawing or adding liquid machine is in the adding liquid mode. At the same time, the second through-hole 6, the second part 11, and the third through-hole 7 are sequentially connected, and the first through-hole 5 is connected with the external air through the sliding hole 4. Lifting and pressing the handle 29 repeatedly to pump up, the handle 29 drives the piston assembly 25 to reciprocate up and down by the connecting rod 28. Thus, each time the piston assembly 25 is depressed, the external air enters into the upper space 26 through the sliding hole 4, the first through-hole 5, and the first pipeline 22, while the air of the lower space 27 enters into the liquid storage tank 30 through the second pipeline 23, the second through-hole 6, the second part 11, and the third pipeline 32. The inside of the liquid storage tank 30 is made into a positive air pressure, so that the liquid inside the liquid storage tank 30 is discharged through the fourth pipeline 33 under the action of positive air pressure to enter into a device that requires adding liquid to perform the adding operation.

As shown in FIG. 1, FIG. 2, FIG. 4, and FIG. 6, in this embodiment, the drawing or adding liquid machine also includes a foundation 34. A lower end of the pump 19 and a lower end of the liquid storage tank 30 both are hermetically and fixedly disposed at the foundation 34, the upper cover 1 has a locating part 35, and the locating part 35 hermetically cooperates with an upper end of the pump 19. Such structure has good strength and is relatively compact.

As shown in FIG. 2, FIG. 4, and FIG. 6, in this embodiment, the piston assembly 25 includes:

a piston 36, an outer side wall of the piston 36 has a second annular groove 37. The second annular groove 37 includes an upper side wall 38, a lower side wall 39, and a columnar side wall 40 connected with the upper side wall 38 and the lower side wall 39. The lower side wall 39 has a connecting hole 41 through the piston 36; and a fourth seal 42, is disposed at the second annular groove 37. The fourth seal 42 is glidingly cooperates with an inside wall of the pump 19, and the thickness of the fourth seal 42 is smaller than the height of the columnar side wall 40. When the piston 36 moves downward, the fourth seal 42 abuts to the upper side wall 38. When the piston 36 moves upward, the fourth seal 42 abuts to the lower side wall 39. A space is disposed between the fourth seal 42 and the upper side wall 38, and the upper space 26 is connected with the lower space 27 through the connecting hole 41.

As shown in FIG. 6, in this embodiment, a shaft of the pump 19 is parallel to a shaft of the liquid storage tank 30, the switching valve foundation 2 is disposed between the pump 19 and the liquid storage tank 30, and the shaft of the sliding hole 4 is vertical to the shaft of the pump 19. Such settings makes the structure more compact.

As shown in FIG. 1, in this embodiment, an upper part of the upper cover 1 has a grip 43, and the disposed grip 43 is convenient for lifting the drawing or adding liquid machine.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A liquid storage tank upper cover assembly of a drawing or adding liquid machine, wherein comprises an upper cover, a switching valve foundation disposed at an upper end of the upper cover and a valve cartridge cooperated with the switching valve foundation, the upper cover and the switching valve foundation are a one-piece molded part, the switching valve foundation has a sliding hole, a lower part of the upper cover has a first through-hole and a second through-hole, the first through-hole and the second through-hole are spaced apart, the first through-hole and the second through-hole are both connected to the sliding hole, the switching valve foundation has a third through-hole connected with the sliding hole; the valve cartridge is glidingly provided in the sliding hole, the valve cartridge has a first working position and a second working position, when the valve cartridge is in the first working position, the first through-hole and the third through-hole are hermetically connected, the second through-hole is connected with an external air by the sliding hole, when the valve cartridge is in the second working position, the second through-hole and the third through-hole are hermetically connected, and the first through-hole is connected with the external air by the sliding hole; wherein an outer side wall of the valve cartridge has a first annular groove, a middle end of the first annular groove has a ringed partition part, the partition part divides the first annular groove into a first part and a second part, two sides of the first annular groove are respectively provided with a first seal and a second seal, an outer side wall of the partition part is provided with a third seal; when the valve cartridge is in the first working position, the first seal and the third seal both are sealed with the sliding hole and the second seal is separated with the sliding hole, the first through-hole, the first part, and the third through-hole are sequentially connected; when the valve cartridge is in the second working position, the second seal and the third seal both are sealed with the sliding hole and the first seal is separated with the sliding hole, and the second through-hole, the second part, and the third through-hole are sequentially connected.

2. The liquid storage tank upper cover assembly of the drawing or adding liquid machine according to claim 1, wherein two ends of the valve cartridge are respectively provided with a first anti-off part and a second anti-off part, the first anti-off part is close to the first through-hole, when the valve cartridge is in the first working position, the first anti-off part abuts to the switching valve foundation, and when the valve cartridge is in the second working position, the second anti-off part abuts to the switching valve foundation.

3. The liquid storage tank upper cover assembly of the drawing or adding liquid machine according to claim 2, wherein the valve cartridge comprises a body part and an operating part, the first annular groove and the partition part both are disposed at the body part, an end of the body part has the first anti-off part, another end has a thread section, the operating part has a thread hole cooperated with the thread section, and an end of the operating part close to the body part has the second anti-off part.

4. The liquid storage tank upper cover assembly of the drawing or adding liquid machine according to claim 1, wherein both two sides of valve cartridge have a ringed mounting slot, the partition part also has a ringed mounting slot, and the first seal, the second seal, and the third seal are disposed in the corresponding ringed mounting slot.

5. A drawing or adding liquid machine, wherein the drawing or adding liquid machine comprises the liquid storage tank upper cover assembly according to claim 1, the drawing or adding liquid machine further comprises:
a pump, an upper part of a side wall of the pump has a first air vent, a lower part of a side wall of the pump has a second air vent, the first air vent is connected with a lower end of the first through-hole through a first pipeline, the second air vent is connected with a lower end of the second through-hole through a second pipeline, the second pipeline has a one-way valve structure, and the one-way valve structure is used to prevent the air from flowing into the pump from the second pipeline;
a piston assembly, is disposed at the pump movably up and down, the piston assembly is divides the pump into an upper space and a lower space, when the piston assembly moves downward, the upper space and the lower space are not connected, the piston assembly pushes the air into the second pipeline, and when the piston assembly moves upward, the upper space and the lower space are connected;
a connecting rod, a lower end of the connecting rod is connected with the piston assembly, and an upper end of the connecting rod is inserted out of the pump;
a handle, is fixedly disposed at the upper end of the connecting rod;
a liquid storage tank, the upper cover is hermetically disposed at an upper end of the liquid storage tank, and a region of the upper cover corresponding to the liquid storage tank has a fourth through-hole;
a third pipeline, an end of the third pipeline is connected with the third through-hole, and another end of the third pipeline is connected with the fourth through-hole; and
a fourth pipeline, an end of the fourth pipeline is disposed at an inside lower end of the liquid storage tank, and another end of the fourth pipeline is inserted out of the upper cover.

6. The drawing or adding liquid machine according to claim 5, wherein an upper part of the upper cover has a grip, and the disposed grip is convenient for lifting the drawing or adding liquid machine.

7. A drawing or adding liquid machine, wherein the drawing or adding liquid machine comprises a liquid storage tank upper cover assembly, the liquid storage tank upper cover assembly comprises an upper cover, a switching valve foundation disposed at an upper end of the upper cover and a valve cartridge cooperated with the switching valve foundation, the upper cover and the switching valve foundation are a one-piece molded part, the switching valve foundation has a sliding hole, a lower part of the upper cover has a first through-hole and a second through-hole, a the first through-hole and the second through-hole are spaced apart, the first through-hole and the second through-hole are both connected to the sliding hole, the switching valve foundation has a third through-hole connected with the sliding hole; the valve cartridge is glidingly provided in the sliding hole, the valve cartridge has a first working position and a second working position, when the valve cartridge is in the first working position, the first through-hole and the third through-hole are hermetically connected, the second through-hole is connected with an external air by the sliding hole, when the valve cartridge is in the second working position, the second through-hole and the third through-hole are hermetically connected, and the first through-hole is connected with the external air by the sliding hole;

the drawing or adding liquid machine further comprises:

a pump, an upper part of a side wall of the pump has a first air vent, a lower part of a side wall of the pump has a second air vent, the first air vent is connected with a lower end of the first through-hole through a first pipeline, the second air vent is connected with a lower end of the second through-hole through a second pipeline, the second pipeline has a one-way valve structure, and the one-way valve structure is used to prevent the air from flowing into the pump from the second pipeline;

a piston assembly, is disposed at the pump movably up and down, the piston assembly is divides the pump into an upper space and a lower space, when the piston assembly moves downward, the upper space and the lower space are not connected, the piston assembly pushes the air into the second pipeline, and when the piston assembly moves upward, the upper space and the lower space are connected;

a connecting rod, a lower end of the connecting rod is connected with the piston assembly, and an upper end of the connecting rod is inserted out of the pump;

a handle, is fixedly disposed at the upper end of the connecting rod;

a liquid storage tank, the upper cover is hermetically disposed at an upper end of the liquid storage tank, and a region of the upper cover corresponding to the liquid storage tank has a fourth through-hole;

a third pipeline, an end of the third pipeline is connected with the third through-hole, and another end of the third pipeline is connected with the fourth through-hole; and a fourth pipeline, an end of the fourth pipeline is disposed at an inside lower end of the liquid storage tank, and another end of the fourth pipeline is inserted out of the upper cover;

wherein the drawing or adding liquid machine comprises a foundation, a lower end of the pump and a lower end of the liquid storage tank both are hermetically and fixedly disposed at the foundation, the upper cover has a locating part, and the locating part hermetically cooperates with an upper end of the pump.

8. The drawing or adding liquid machine according to claim 7, wherein the piston assembly comprises:

a piston, an outer side wall of the piston has a second annular groove, the second annular groove comprises an upper side wall, a lower side wall, and a columnar side wall connected with the upper side wall and the lower side wall, and the lower side wall has a connecting hole through the piston; and a fourth seal, is disposed at the second annular groove, the fourth seal is glidingly cooperates with an inside wall of the pump, the thickness of the fourth seal is smaller than the height of the columnar side wall, when the piston moves downward, the fourth seal abuts to the upper side wall, when the piston moves upward, the fourth seal abuts to the lower side wall, a space is disposed between the fourth seal and the upper side wall, and the upper space is connected with the lower space through the connecting hole.

9. The drawing or adding liquid machine according to claim 7, wherein a shaft of the pump is parallel to a shaft of the liquid storage tank, the switching valve foundation is disposed between the pump and the liquid storage tank, and the shaft of the sliding hole is vertical to the shaft of the pump.

* * * * *